US011128477B2

(12) United States Patent
Uehara et al.

(10) Patent No.: US 11,128,477 B2
(45) Date of Patent: Sep. 21, 2021

(54) ELECTRONIC CERTIFICATION SYSTEM (71) Applicant: INTERNETWORKING & BROADBAND CONSULTING CO., LTD., Tokyo (JP)

(72) Inventors: Toshiyuki Uehara, Tokyo (JP); Ken Tajima, Tokyo (JP)

(73) Assignee: Internetworking & Broadband Consulting Co., Ltd., Tokyo (JP)

(*) Notice: Subject to any disclaimer, the term of this patent is extended or adjusted under 35 U.S.C. 154(b) by 307 days.

(21) Appl. No.: 16/333,931

(22) PCT Filed: Apr. 9, 2018

(86) PCT No.: PCT/JP2018/014855
§ 371 (c)(1),
(2) Date: Mar. 15, 2019

(87) PCT Pub. No.: WO2018/190285
PCT Pub. Date: Oct. 18, 2018

(65) Prior Publication Data
US 2019/0253260 A1    Aug. 15, 2019

(30) Foreign Application Priority Data

Apr. 10, 2017  (JP) .............................. JP2017-077839

(51) Int. Cl.
*H04L 29/06* (2006.01)
*H04L 9/32* (2006.01)
(Continued)

(52) U.S. Cl.
CPC ............ *H04L 9/3263* (2013.01); *G06F 21/64* (2013.01); *G09C 1/00* (2013.01); *H04L 9/30* (2013.01);
(Continued)

(58) Field of Classification Search
CPC ....... H04L 9/3263; H04L 9/30; H04L 9/3239; H04L 9/3247; H04L 9/3268;
(Continued)

(56) References Cited

U.S. PATENT DOCUMENTS 9,280,684 B1 *  3/2016  Kragh ..................... H04W 4/90
10,142,333 B1 * 11/2018  Griffin ................ H04L 63/0861
(Continued)

FOREIGN PATENT DOCUMENTS

JP    H10-135943 A    5/1998
JP    H10-285157 A   10/1998
(Continued)

OTHER PUBLICATIONS

Sasaki, Ryoichi, "Network trend. A digital signature and PKI", Computer & Network LAN, Japan, Ohm-Sha, Ltd., the 19th volume With restriction of No. 1, pp. 93-99, (2001); See the attached English translation of Japanese Office Action for a concise explanation of the relevance.
(Continued)

*Primary Examiner* — Malcolm Cribbs
(74) *Attorney, Agent, or Firm* — Hamre, Schumann, Mueller & Larson, P.C.

(57) ABSTRACT

An electronic certification system that can simplify a process for verification of reliability while improving reliability. The electronic certification system guarantees reliability of data using an audit trail registered in a blockchain, the data being provided to a second terminal such as a client by a first terminal such as a server, the first terminal includes audit trail registration for registering information and the data as the audit trail in the blockchain, the information relating at least one of the first terminal, an administrator of the first terminal, and a program configured to run on the first terminal and exchange the data with the second terminal,
(Continued)

and an audit trail provider for transmitting the audit trail to the second terminal. The second terminal determines that the data is reliable if the audit trail provided by the audit trail provider has been registered in the blockchain.

3 Claims, 11 Drawing Sheets (51) Int. Cl.
*G06F 21/64* (2013.01)
*H04L 9/30* (2006.01)
*G09C 1/00* (2006.01)

(52) U.S. Cl.
CPC .......... *H04L 9/3239* (2013.01); *H04L 9/3247* (2013.01); *H04L 9/3268* (2013.01); *G06F 2221/2101* (2013.01); *H04L 2209/38* (2013.01)

(58) Field of Classification Search
CPC ................. H04L 2209/38; G06F 21/64; G06F 2221/2101; G09C 1/00
See application file for complete search history.

(56) References Cited

U.S. PATENT DOCUMENTS

| | | | | |
|---|---|---|---|---|
| 2005/0108537 | A1* | 5/2005 | Puri | G06F 21/64 713/176 |
| 2011/0055039 | A1* | 3/2011 | Paz | G06Q 30/08 705/26.3 |
| 2014/0019761 | A1* | 1/2014 | Shapiro | H04L 9/3247 713/176 |
| 2015/0244690 | A1 | 8/2015 | Mossbarger | |
| 2015/0288694 | A1* | 10/2015 | Liebl, III | H04L 63/0884 713/182 |
| 2017/0300898 | A1* | 10/2017 | Campero | H04L 9/3236 |
| 2018/0026979 | A1* | 1/2018 | Cox | G06F 21/6227 713/165 |
| 2018/0060596 | A1* | 3/2018 | Hamel | G06F 21/64 |
| 2018/0115538 | A1* | 4/2018 | Blake | H04L 9/14 |
| 2018/0121918 | A1* | 5/2018 | Higgins | G06Q 20/02 |
| 2018/0137507 | A1* | 5/2018 | Jayachandran | G06Q 20/401 |
| 2018/0139186 | A1* | 5/2018 | Castagna | H04L 9/3242 |
| 2018/0248880 | A1* | 8/2018 | Sardesai | H04L 9/3239 |
| 2018/0285479 | A1* | 10/2018 | Mackay | G06F 21/6218 |
| 2019/0303931 | A1* | 10/2019 | Valencia | G06Q 20/3278 |

FOREIGN PATENT DOCUMENTS

| | | |
|---|---|---|
| JP | 2002-139996 A | 5/2002 |
| JP | 2004-040830 A | 2/2004 |
| JP | 2008-186064 A | 8/2008 |

OTHER PUBLICATIONS

Higashikado, Yoshiki et al, "A study on certificate management in consortium chain", Proceedings of the 2017 SCIS, 1F2-3, pp. 1-4, (Jan. 24, 2017); See the attached English translation of Japanese Office Action for a concise explanation of the relevance.

Ohashi, Shigenori et al., "A registration method for digital content management systems utilizing blockchains", IEICE technical report, vol. 116, No. 23, pp. 13-18, (2016); See the attached English translation of International Search Report for a concise explanation of the relevance.

Sakurai, Mitsuko et al., "A Design of Key Management Methods Considering Public Key Certificate's Update", Proceedings of 19th workshop of multimedia communication and distributed processing, Information Processing Society of Japan, pp. 93-100, (1995); See the attached English translation of International Search Report for a concise explanation of the relevance.

Fuchida, Yasuyuki, "Special edition: Innovation and improvement of financial blockchain and financial transaction", Nomura capital markets quarterly, vol. 19, No. 2, pp. 11-35, (2015); See the attached English translation of International Search Report for a concise explanation of the relevance.

Watanabe, Hiroyuki, "Optimal solution for PKI in blockchain technology!!(latter part)", Company information of Cybertrust Japan Co., Ltd., available at: https://www.cybertrust.ne.jp/journal/block-chain-pki-vol2.html, (2016); See the attached English translation of International Search Report for a concise explanation of the relevance.

Office Action issued in Japanese patent application No. 2017-156053, dated Sep. 21, 2018, 16 pages.

International Search Report issued in PCT/JP2018/014855, dated May 15, 2018, 5 pages.

\* cited by examiner

ELECTRONIC CERTIFICATION SYSTEM

TECHNICAL FIELD

The present invention relates to an electronic certification system that guarantees reliability of data such as a public key used in Public Key Infrastructure.

BACKGROUND ART

Conventionally, to conduct communications and the like via the Internet securely, the Public Key Infrastructure is used widely. This makes use of a feature that data encrypted by the public key can be decrypted only by the private key and that data encrypted by the private key can be decrypted only by the public key.

However, this feature involves the risk that if a third party provides the public key under the guise of an originally intended communications partner, information can be acquired illegally. To avoid this, a system of using an electronic certificate is in use.

Figure 14:
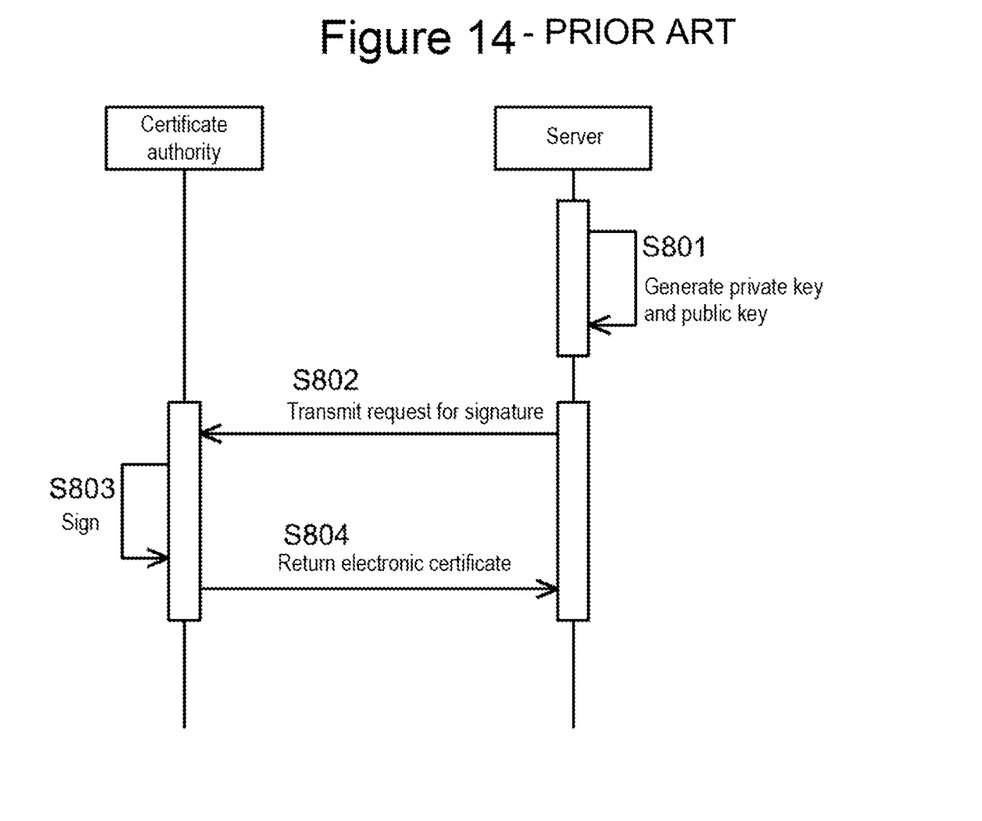
FIG. 14 is a sequence diagram showing an electronic certificate publication process of a conventional certificate authority.

As an example, description will be given of a case in which server-client communications are conducted using the Public Key Infrastructure. FIG. 14 is a diagram showing a flow of a process in which an electronic certificate is prepared on the server side in advance.

First, in step S801, the server generates its own private key and public key. The private key generated here needs to be managed strictly to prevent leakage and the like.

In step S802 next, the server transmits a signing request to a certificate authority. Here, the certificate authority is an organization that guarantees by giving an electronic signature that an electronic certificate is authentic, and the legitimacy is further guaranteed by issuance of a certificate by an upper-level certificate authority. Also, the signing request, which includes the server's public key generated in step S801, server owner information, the server's FQDN and IP addresses, and other information used by a client to access the server, is used to request the certificate authority to create an electronic certificate by electronically signing the above-mentioned information.

Then, in step S803, an electronic certificate of the server is generated under an electronic signature of the certificate authority. More specifically, the electronic signature of the certificate authority is given by encrypting a hash value and the like of information contained in the signing request with the private key of the certificate authority itself. Then, in step S804, the electronic certificate is returned to the server.

Figure 15:
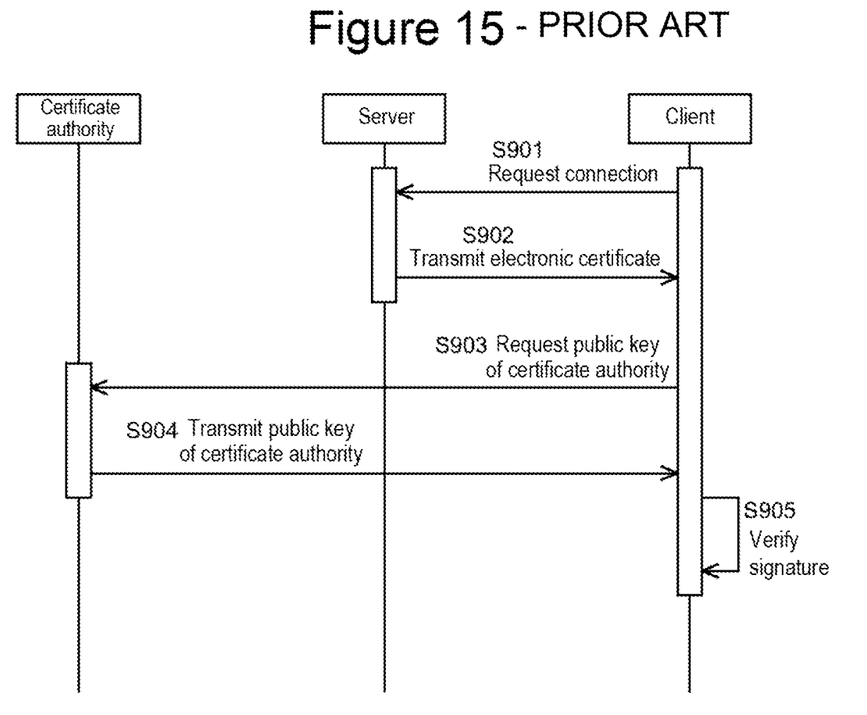
FIG. 15 is a sequence diagram showing a process performed between a server and client by a conventional system at the start of communications.

After the electronic certificate of the server is prepared by the above processes, the certificate is used in processes such as shown in FIG. 15 in server-client communications. First, when there is a connection request from a client in step S901, the server transmits its own electronic certificate to the client in step S902.

Upon receiving the electronic certificate, the client identifies the certificate authority that has electronically signed the electronic certificate, based on content of the electronic certificate, and requests a public key from the certificate authority in step S903 to verify the electronic signature.

In step S904, the public key of the certificate authority is provided to the client from the certificate authority, and the client verifies the electronic signature in step S905. This uses the feature of public key and private key described earlier, i.e., the electronic signature is decrypted by the public key of the certificate authority to check whether the original hash value and the like can be obtained properly.

Then, if the electronic signature is verified successfully in step S905, the client trusts the electronic certificate as being authentic and conducts subsequent communications with the server. Examples of the communications with the server include communications in which when transmitting data, the client encrypts the data with the public key contained in the electronic certificate and transmits the data in a state in which only the server having the corresponding private key can decrypt the data. Also, when it is necessary to keep bidirectional communications between the server and client secure, a client-side public key is transmitted to the server in a similar manner.

Note that although omitted here for simplicity of explanation, to verify whether the certificate authority itself is credible, the client acquires an electronic certificate of the certificate authority and verifies the electronic certificate and finally determines that the electronic certificate is credible under the assumption that a root certificate registered with the client is credible.

The above is a general flow of a process for preparation of an electronic certificate in using the Public Key Infrastructure and for starting of server-client communications. Besides transmission of a public key, the electronic certificate is also used, for example, for the purpose of giving an electronic signature to a document such as an electric mail to guarantee that the sender or content of the document has not been falsified. In this way, guaranteeing reliability by means of an electronic certificate is used in the exchange of various data whose senders and content are required to be reliable, and moreover systems resulting from application of guaranteeing reliability by means of an electronic certificate have been developed.

For example, Patent Literature 1 describes a distributed authentication system with the participation of plural nodes, some representative nodes of which operate as a certificate authority to increase resistance against attacks on the certificate authority. This uses a configuration in which whereas plural representative nodes in cooperation give an electronic signature using a representative private key, none of the representative nodes holds the representative private key itself, disabling the participants of the system from knowing the representative private key itself used for electronic signatures.

Also, Patent Literature 2 describes a system configured to keep a log of electronic signatures and check the log during verification of an electronic signature to make it possible to distinguish between an electronic signature given authentically by an authentic signatory and an electronic signature given by a third party under the guise of the authentic signatory.

CITATION LIST

Patent Literature

[Patent Literature 1] Japanese Patent Laid-Open No. 2008-186064
[Patent Literature 2] Japanese Patent Laid-Open No. 2004-40830

SUMMARY OF INVENTION

Technical Problem

A trust model using the conventional electronic certificate is based on the premise that the certificate authority that gives the electronic signature is reliable. Therefore, if leakage or the like of the private key used for electronic signatures by the certificate authority occurs, the electronic signatures of the certificate authority become completely meaningless.

This is also true for a case in which the role of the certificate authority is divided into plural nodes as with the system described in Patent Literature 1, and it is not absolutely sure that leakage and the like of the private key will not occur, even in the case of a configuration in which the private key used for electronic signatures is not managed by a single node and any configuration in which trust is guaranteed by an electronic signature using the private key has the problem similar to that of the conventional technique described above in that a trust model will collapse if the private key leaks.

Also, with the system described in Patent Literature 2, even if the private key used for electronic signatures by the certificate authority leaks out, by referring to the log of electronic signatures, it is possible to tell whether an electronic signature has been given authentically, but there is a problem in that a verification process on the side of the client becomes complicated. That is, even in the case of a trust model using the conventional electronic certificate, the verification process requires not only verification of the electronic certificate to be actually verified and verification of the electronic certificate of the certificate authority that has given the electronic signature, but also verification of the log of electronic signatures, increasing processing costs on the part of the client.

Thus, an object of the present invention is to provide an electronic certification system that can simplify a process for verification of reliability while improving reliability.

Solution to Problem

To solve the above problem, the present invention provides an electronic certification system that guarantees reliability of data using an audit trail registered in a blockchain, the data being provided to a second terminal by first terminal, wherein: the first terminal includes: audit trail registration means for registering information and the data as the audit trail in the blockchain, the information being about at least one of the first terminal, an administrator of the first terminal, and a program configured to run on the first terminal and exchange the data with the second terminal, and audit trail providing means for transmitting the audit trail to the second terminal; and the second terminal determines that the data is reliable if the audit trail provided by the audit trail providing means has been registered in the blockchain.

The configuration, in which the data provided by the first terminal such as a server is registered in the blockchain and then acquired by the second terminal such as a client, makes it possible to provide reliable data because of the feature that does not allow data deletion and overwrites in blockchains. Also, because decryption of an electronic signature with a public key and processes such as calculation of a hash value can be omitted on the client side or other data-receiving side as with the system using the conventional electronic certificate, communications and processes for a verification process can be reduced greatly.

According to another form of the present invention, there is provided an electronic certification system that guarantees reliability of data using an audit trail registered in a blockchain, the data being registered in a data store by a first terminal and provided to a second terminal, wherein: the first terminal includes: audit trail registration means for registering information in the blockchain and acquiring the audit trail, the information being about at least one of the first terminal, an administrator of the first terminal, and a program configured to run on the first terminal and exchange the data with the second terminal, and store registration means for linking together and registering the audit trail and the data in the data store, and audit trail providing means for transmitting the audit trail to the second terminal; and the second terminal acquires the data from the data store using the audit trail provided by the audit trail providing means.

The configuration, in which the audit trail is stored in the blockchain and the data whose reliability is guaranteed is stored in the data store, makes it possible to provide more diverse data while guaranteeing reliability using a feature of the blockchain.

According to another form of the present invention, there is provided an electronic certification system that guarantees reliability of data using an audit trail registered in a blockchain, the data being contained in an electronic certificate and provided to a second terminal, the electronic certificate being registered in an electronic certificate store by a first terminal, wherein: the first terminal includes: audit trail registration means for registering information in the blockchain and acquiring the audit trail, the information being about at least one of the first terminal, an administrator of the first terminal, and a program configured to run on the first terminal and exchange the data with the second terminal, electronic certificate registration means for generating the electronic certificate and linking together and registering the audit trail and the electronic certificate in the electronic certificate store, and electronic certificate providing means for verifying validity of the audit trail registered in the blockchain, acquiring the electronic certificate corresponding to the audit trail from the electronic certificate store, and transmitting the electronic certificate to the second terminal; and the second terminal retrieves the data from the electronic certificate provided by the electronic certificate providing means.

The configuration, in which the validity of the audit trail is verified on the side of the first terminal such as a server and data is provided in the form of the electronic certificate to the second terminal such as a client, makes it possible to use the system widely on the client and the like capable of handling conventional electronic certificates.

According to a preferred form of the present invention, if another audit trail invalidating the audit trail exists in the blockchain by being registered later than the audit trail, the audit trail is determined to be invalid.

This makes it possible to implement a configuration capable of setting and invalidating an expiration date, as with conventional electronic certificates, while using a blockchain having a feature that does not allow data deletion and overwrites.

According to a preferred form of the present invention, the data is a public key of the first terminal.

In this way, as the reliability of the public key used for communications is guaranteed by Public Key Infrastructure, it is possible to assist secure communications between terminals.

Advantageous Effects of Invention

The present invention provides an electronic certification system that can achieve both improvement of reliability using a feature of a blockchain and reduction of processes for verification of reliability.

DESCRIPTION OF EMBODIMENTS

Embodiment 1

Figure 1:
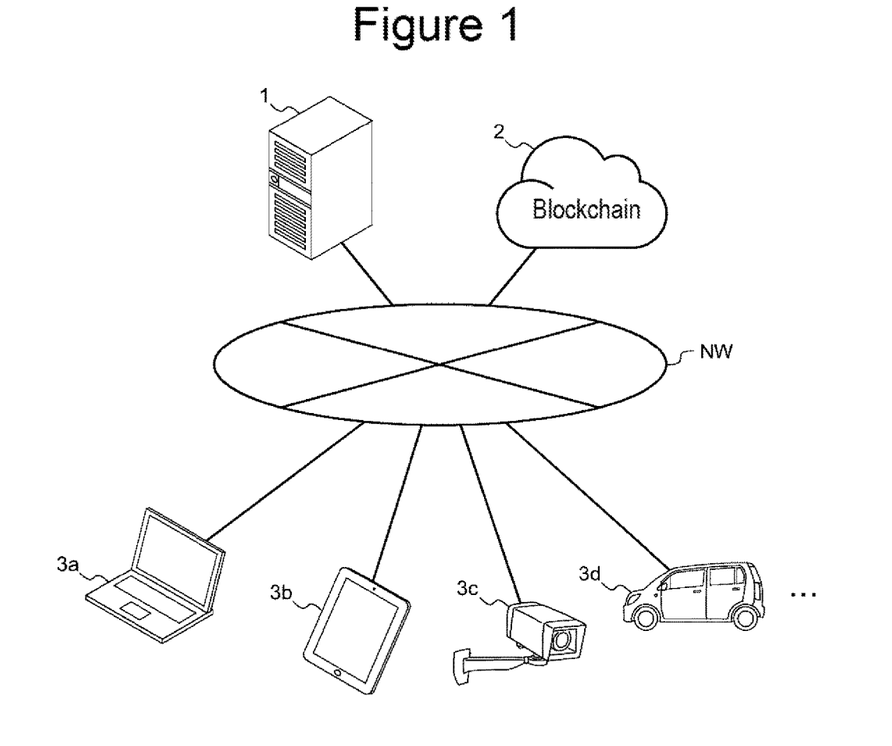
FIG. 1 is a configuration diagram of an electronic certification system according to Embodiment 1 of the present invention.

Embodiment 1 of the present invention will be described in detail below with reference to the drawings. FIG. 1 is a configuration diagram of an electronic certification system according to the present embodiment. In the electronic certification system according to the present embodiment, a server 1, a blockchain 2, and plural clients 3 (3a to 3d: hereinafter referred to simply as the clients 3 when there is no particular need to distinguish among the clients) are configured to be able to communicate with one another via a network NW such as the Internet. A public key of the server 1 is provided from the server 1 to the clients 3 to conduct communications between the server 1 and clients 3 using Public Key Infrastructure, and reliability of the public key is guaranteed using the blockchain 2.

Note that the blockchain 2, which is originally used as a distributed ledger for Bitcoin of a virtual currency, is made up of a large number of nodes, but is shown here as being a single component as illustrated in FIG. 1 for simplicity of explanation.

The blockchain 2 is formed by a chain of data called blocks. Every block contains information on a hash value of the preceding block, and consequently if any of the blocks is falsified, there arises inconsistency in a chain relation. Also, being a distributed system made up of a large number of nodes, the blockchain 2 has a feature that does not allow illegal falsification and deletion of blocks caused by manipulation of a single node or the like. Note that a block generated by registration of information about the server 1 and data such as the public key of the server 1 will be referred to herein as an audit trail.

Figure 2:
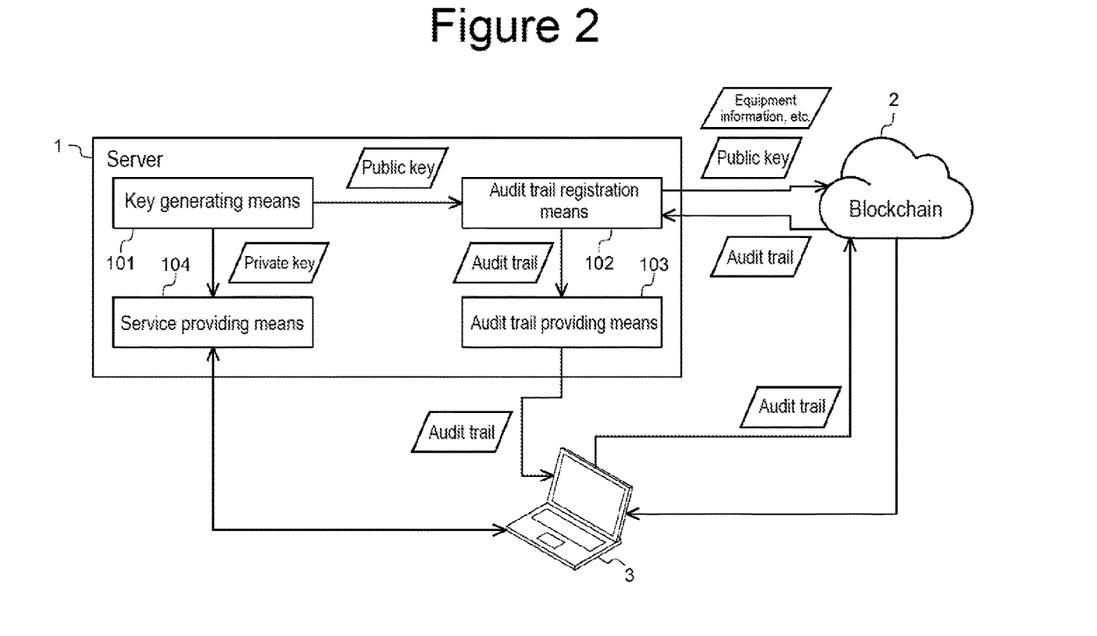
FIG. 2 is a functional block diagram of the electronic certification system according to Embodiment 1 of the present invention.

FIG. 2 shows a functional block diagram of the electronic certification system according to the present embodiment. As illustrated in FIG. 2, the server 1 includes key generating means 101 for generating a public key and private key of the server 1; audit trail registration means 102 for registering the public key generated by the key generating means 101 and information about the server 1 in the blockchain 2 and acquiring an audit trail from the blockchain 2; audit trail providing means 103 for providing the audit trail to the clients 3; and service providing means 104 for providing the public key generated by the key generating means 101 and a service based on the Public Key Infrastructure using the private key to the clients 3 from the server 1.

A typical computer apparatus such as server equipment can be used as the server 1, where the computer apparatus is equipped with an arithmetic unit such as a CPU; a main memory such as a RAM (Random Access Memory); auxiliary memories such as an HDD (Hard Disk Drive), SSD (Solid State Drive), and flash memory; and various input/output devices including means for connecting to the network NW. More specifically, the computer apparatus can be used as the server 1 in the electronic certification system according to the present embodiment as follows: programs configured to make the server 1 operate as the above-mentioned means are stored in the auxiliary memories in advance or by operation and the like of an administrator of the server 1 and the programs are loaded into the main memory to make the arithmetic unit perform calculations and thereby to control input/output means. Note that whereas the present embodiment is configured to implement the server 1 using a single computer apparatus, the present invention is not limited to this. For example, the server 1 may be implemented by plural computer apparatuses as with a configuration in which the service providing means 104 is provided in another computer apparatus.

A typical computer apparatus equipped with an arithmetic unit, a main memory, auxiliary memories, and various input/output devices including means for connecting to the network NW can also be used as the clients 3. Whereas a personal computer 3a, tablet terminal 3b, network camera 3c, and in-vehicle device 3d are shown as an example in FIG. 1, the present invention is not limited to this, and various other types of computer apparatus can be used as the clients 3.

<Audit Trail Registration Process>

Figure 3:
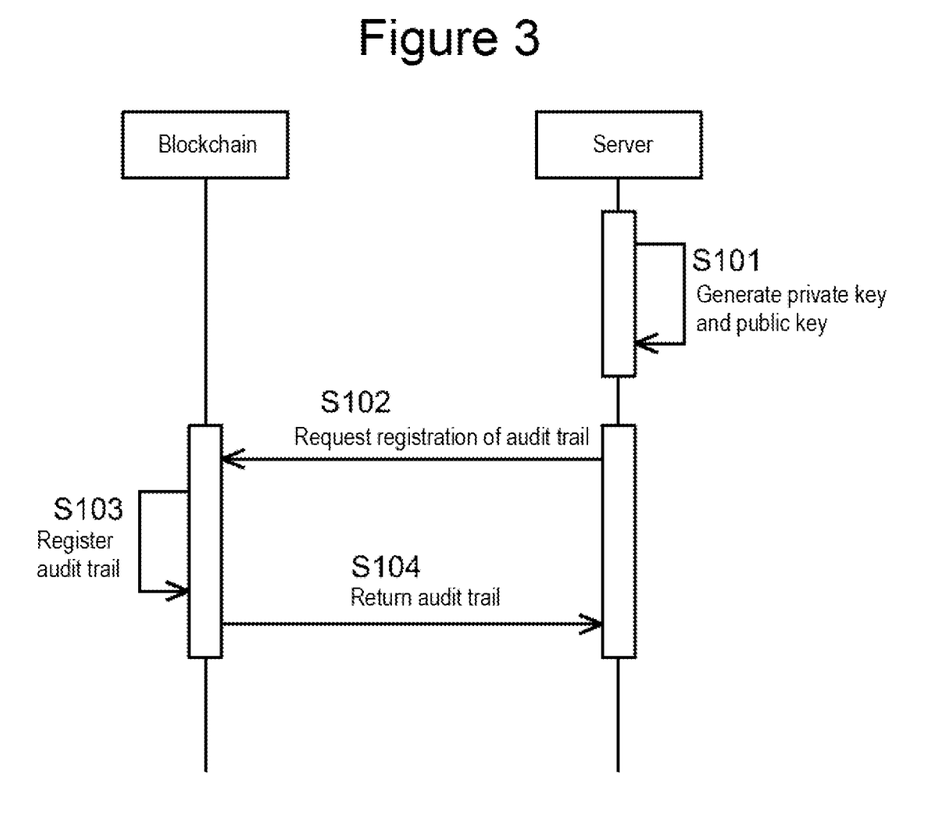
FIG. 3 is a sequence diagram showing the process of registering an audit trail and public key according to Embodiment 1 of the present invention.

FIG. 3 is a sequence diagram showing a flow of a process performed by the server 1 to register an audit trail in the blockchain 2. First, in step S101, the key generating means 101 performs the process of generating a private key and public key of the server 1. More specifically, by generating a private key first, a corresponding public key may be generated using the private key. The generated public key is passed to the audit trail registration means 102 in order to be registered in the blockchain 2. On the other hand, the private key needs to be handled in such a ways as to prevent leakage and the like.

In step S102 next, an audit trail registration request is sent from the audit trail registration means 102 to the blockchain 2. Namely, this is the process of requesting information including information about the server 1, information about the administrator of the server 1, and information about the service providing means 104 supposed to conduct communications later based on the Public Key Infrastructure using the public key as well as generation of a block via registration of the public key in the blockchain 2.

In step S103, based on the request from the audit trail registration means 102, data such as information about the server 1 and the public key are registered in the blockchain 2, i.e., a block generation process is carried out. Then, the generated block is returned as an audit trail to the server 1 in step S104. This completes the processes performed by the server 1 to register the audit trail in the blockchain 2.

Note that, preferably, the registration of the audit trail in the blockchain 2 is managed by a group audited appropriately, such as a group that has implemented ISMS (Information Security Management System). This makes it possible to prevent registration of an inappropriate audit trail in the blockchain 2 and further improve reliability of the electronic certification system according to the present embodiment. Also, even if an illegal audit trail is registered in the blockchain 2, traces of the illegal registration remains unremovable in the blockchain 2, and can be used to grasp the situation and take recurrence-prevention measures.

<Public Key Providing Process>

Figure 4:
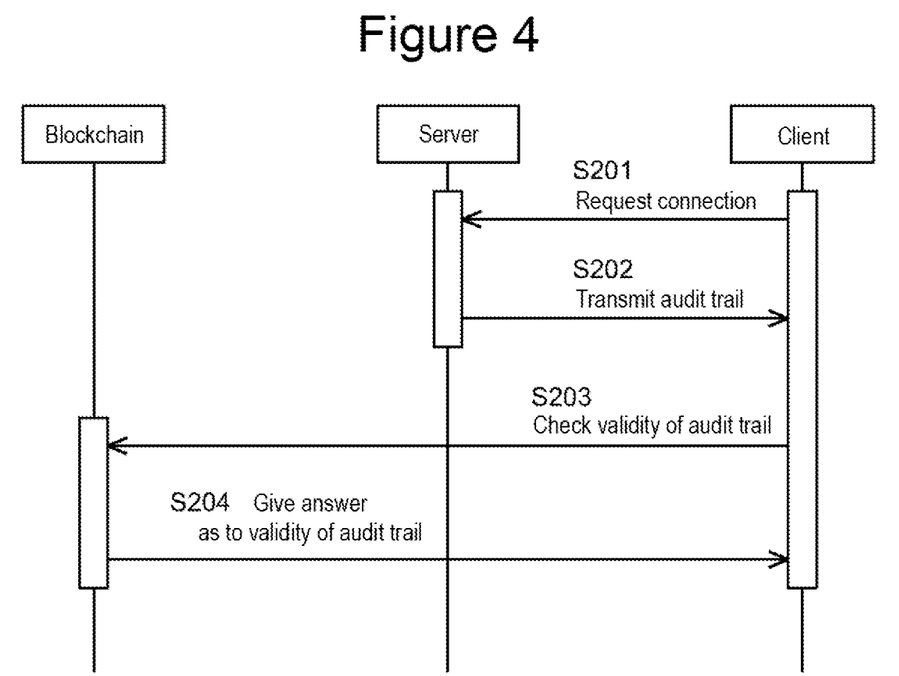
FIG. 4 is a sequence diagram showing a process performed between a server and client at the start of communications according to Embodiment 1 of the present invention.

FIG. 4 is a sequence diagram showing a flow of a process performed between the server 1 and client 3 at the start of communications using the Public Key Infrastructure. First, in step S201, a connection request is transmitted from the client 3 to the server 1. Upon receiving the connection request, the server 1 transmits the audit trail to the client 3 via the audit trail providing means 103 in step S202.

Upon receiving the audit trail, the client 3 checks the validity of the audit trail with the blockchain 2 in step S203. Namely, the client inquires whether the audit trail exists in the blockchain 2.

Then, in step S204, the blockchain 2 gives an answer as to the validity of the audit trail to the client 3. Here, if the audit trail exists in the blockchain 2, the client 3 can determine that it is safe to conduct communications with the server 1 identified by information contained in the audit trail, using the public key of the server 1 similarly contained in the audit trail.

After the client 3 confirms the safety of the public key of the server 1, data encrypted with the private key of the server 1 is transmitted to the client 3, the client 3 decrypts the data with the public key of the server 1, encrypts the data with the public key of the server 1, and transmits the encrypted data to the server 1, and the server 1 decrypts the data with the private key of the server 1. In this way, communications can be conducted using the Public Key Infrastructure.

In this way, the configuration in which the reliability of the public key is verified by checking whether an audit trail exists in the blockchain 2 eliminates the need to perform processes including acquisition of a public key for verification of an electronic signature, decryption of the electronic signature, and calculation of a hash value until the process gets to a root certificate, which are needed for verification of conventional electronic certificates. Consequently, an amount of processing and volume of communications traffic on the client 3 can be reduced greatly.

<Audit Trail Invalidation Process>

It is conceivable that depending on circumstances, a need will arise to change the public key of the server 1, for example, after a lapse of a predetermined period and delete the audit trail of registration of an old public key from the blockchain 2. However, as described earlier, the feature of the blockchain 2 is that the blockchain 2 does not allow updates and deletion of blocks. Therefore, in such a case, the audit trail is invalidated by a process such as shown in the sequence diagram of FIG. 5.

Figure 5:
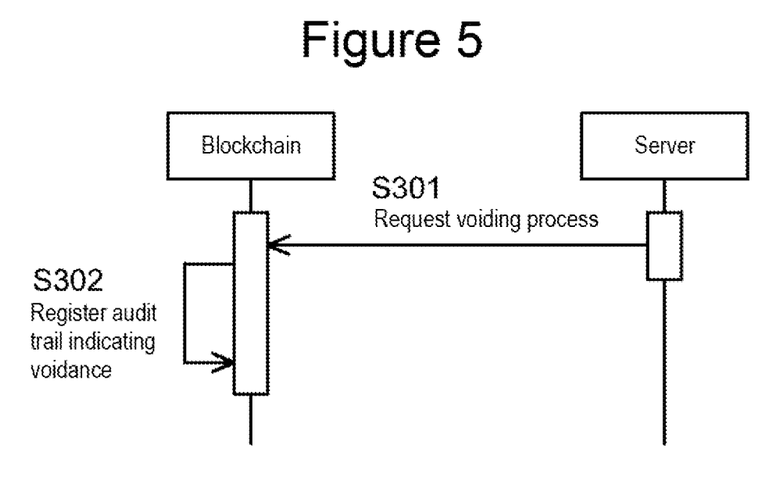
FIG. 5 is a sequence diagram showing an audit trail invalidation process according to Embodiment 1 of the present invention.

First, in step S301, the server 1 transmits a request for an invalidation process for an audit tail registered in the past by the server 1 to the blockchain 2. Namely, this is a request to generate a new block indicating that the specific audit trail is invalid. Then, in step S302, such a block is generated in the blockchain 2, thereby finishing the invalidation process for the audit trail.

If an audit trail is invalidated in this way, when the client 3 checks with the blockchain 2 whether the audit trail is valid at the start of communications between the server 1 and client 3 in step S203, even if the audit trail exists in the blockchain 2, when there is a block invalidating the audit trail, it is determined that the audit trail is invalid.

This allows invalidation of a public key and other processes to be carried out even when the blockchain 2 having a feature that does not allow updates and deletion of blocks is used.

<Guaranteeing Reliability of Other Data>

Whereas an example of guaranteeing the reliability of the public key of the server 1 used for communications between the server 1 and client 3 has been shown in the present embodiment, the present invention is not limited to this, and reliability of various data conventionally guaranteed by data such as an electronic certificate can be guaranteed.

For example, to guarantee that a document such as an electric mail is not falsified, in step S101 of the audit trail registration process described with reference to FIG. 3, instead of generating the private key and public key, the hash value of the document can be calculated and the hash value can be registered in the blockchain 2 in steps S102 and S103 that follow. In this way, if the hash value of the document is registered in the blockchain 2 and the audit trail is provided together with the document, the party provided with the document can calculate the hash value and determine that the document has not been falsified when calculation results match content of the hash value.

Note that although in the example shown in the present embodiment, server equipment is used as the server 1 and so-called client equipment including a personal computer is used as the clients 3, the terms "server" and "client" as referred to herein do not designate such specific equipment, and among plural pieces of equipment making up a client-server model, simply those playing the role of transmitting data are referred to as "servers" and those playing the role of receiving the data are referred to as "clients". That is, as in the case of a client certificate, when the intended use is to certify to the server equipment to be connected that the client equipment such as a personal computer or mobile device is legitimate, the client equipment that transmits information about itself will play the role of a "server" and the server equipment and the like that receive and verify the information will play the role of "clients".

Furthermore, not only in a client-server model, but also more simply in the case where data is exchanged between two or more devices via any physical storage media, the reliability of the data can be guaranteed to the terminal to which the data is provided. That is, as long as data is passed from one terminal to another terminal, the reliability of the data can be guaranteed by the application of the electronic certification system according to the present invention regardless of whether an audit trail is provided via a network as shown in the present embodiment or by another method such as via a physical storage medium.

As described above, by making use of the feature that does not allow data deletion and overwrites in blockchains, the electronic certification system according to the present embodiment can omit a signature verification process on the client side (i.e., data-receiving side) and can guarantee high reliability.

Also, reliability can be guaranteed through registration of an audit trail in the blockchain 2 by omitting processes such as a request to a certificate authority for an electronic signature and confirmation of the requester and request details by the certificate authority as with a trust model using the conventional electronic certificate. Consequently, especially great efficiency can be expected in cases such as when legitimacy of a large amount of data needs to be guaranteed in relation to a large number of terminals each of which has a public key/private key.

Embodiment 2

Figure 6:
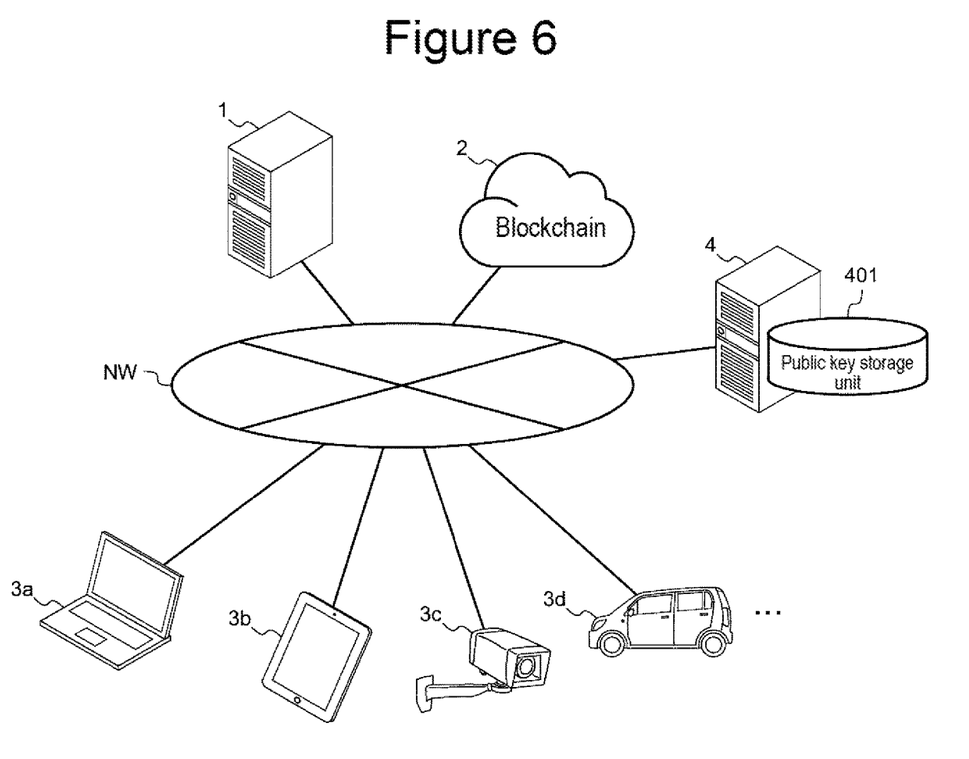
FIG. 6 is a configuration diagram of an electronic certification system according to Embodiment 2 of the present invention.

Embodiment 2 of the present invention will be described in detail below with reference to the drawings. Note that basically the same components as those in Embodiment 1 described above are denoted by the same reference numerals as the corresponding components in Embodiment 1, and description thereof will be omitted. FIG. 6 is a configuration diagram of an electronic certification system according to the present embodiment. As illustrated in FIG. 2, in addition to the server 1, blockchain 2, and clients 3, a public key store 4 equipped with a public key storage unit 401 is connected to the electronic certification system according to the present embodiment in such a way as to be able to communicate via the network NW.

Figure 7:
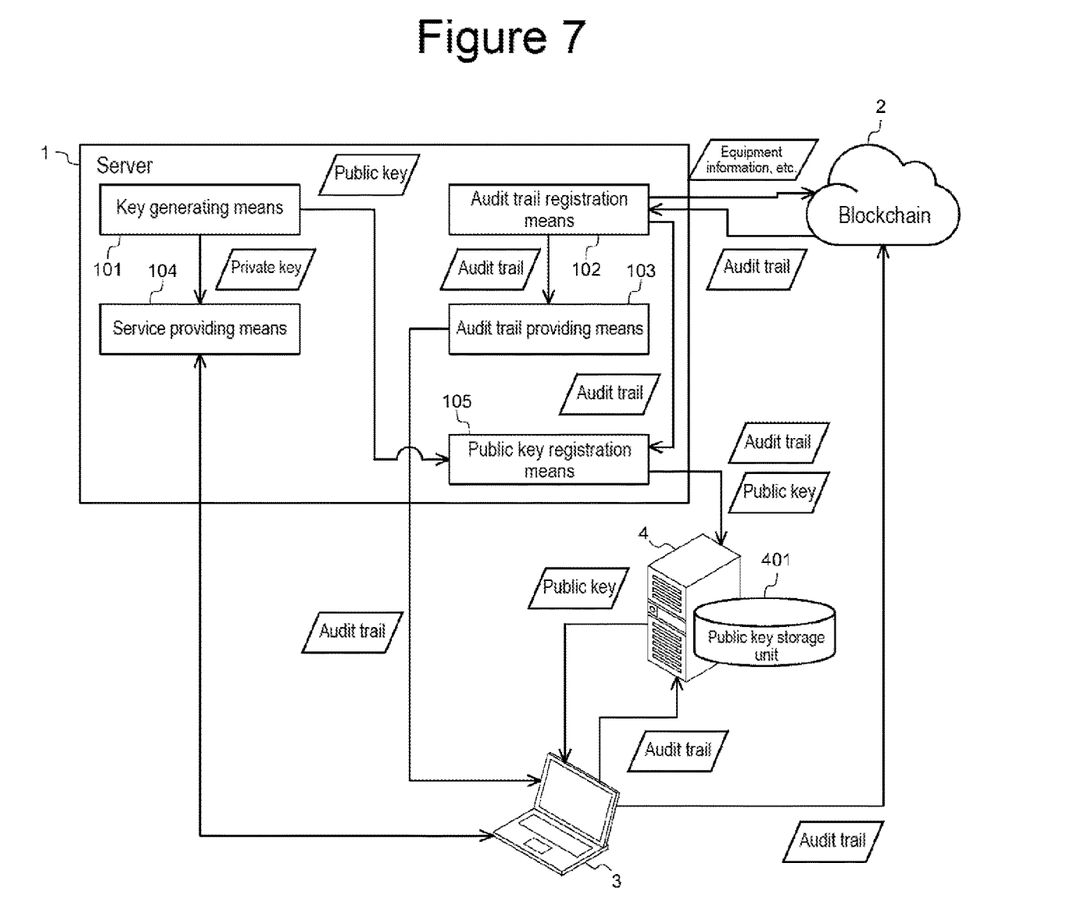
FIG. 7 is a functional block diagram of the electronic certification system according to Embodiment 2 of the present invention.

FIG. 7 is a functional block diagram of the electronic certification system according to the present embodiment. As illustrated in FIG. 7, in addition to the key generating means 101, audit trail registration means 102, audit trail providing means 103, and service providing means 104, the server 1 includes public key registration means 105 for requesting the public key store 4 to register a public key.

<Audit Trail Registration Process>

Figure 8:
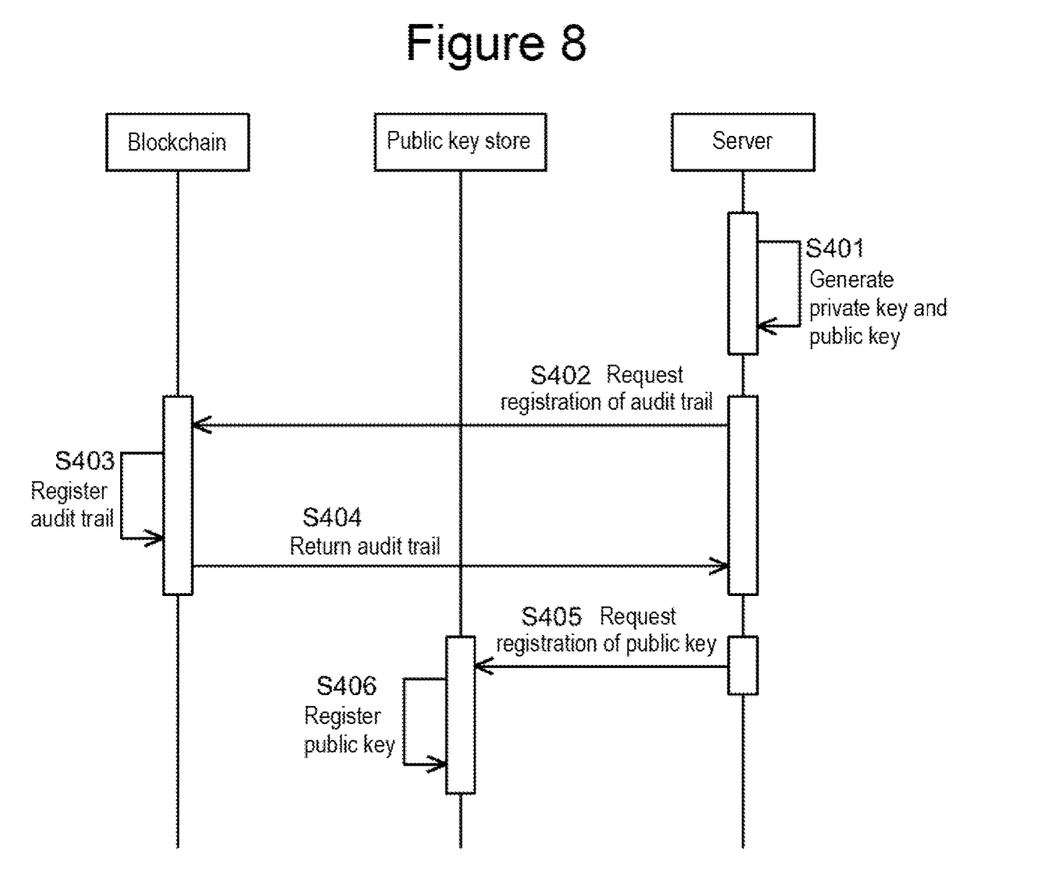
FIG. 8 is a sequence diagram showing the process of registering an audit trail and a public key according to Embodiment 2 of the present invention.

FIG. 8 is a sequence diagram showing a flow of the process of registering an audit trail in the blockchain 2 and the process of registering a public key in the public key store 4 in the electronic certification system according to the present embodiment. First, in step S401, the key generating means 101 performs the process of generating a private key and public key of the server 1.

In step S402, the audit trail registration means 102 performs the process of registering an audit trail in the blockchain 2. In the present embodiment, the process is requesting generation of a block via registration of information in the blockchain 2-the information including information about the server 1, information about the administrator of the server 1, and information about the service providing means 104 supposed to conduct communications later based on the Public Key Infrastructure using the public key of the server 1-and the public key itself of the server 1 is not registered in the blockchain 2. After the request in step S402, the block is generated in step S403 and the block is returned as an audit trail to the server 1 in step S404.

After the audit trail is registered in the blockchain 2 in the above process, in step S405, the server 1 requests the public key store 4 to register the public key. In this request, the audit trail returned in step S404 and the public key generated in step S401 are requested to be recorded in the public key storage unit 401 of the public key store 4 by being linked together. In response to the request, the public key store 4 records the audit trail and public key in the public key storage unit 401 in step S406.

As a result of the above process, the information about the server 1 and the like are stored as an audit trail in the blockchain 2 and the public key of the server 1 is stored in the public key store 4 by being linked to the audit trail.

<Public Key Providing Process>

Figure 9:
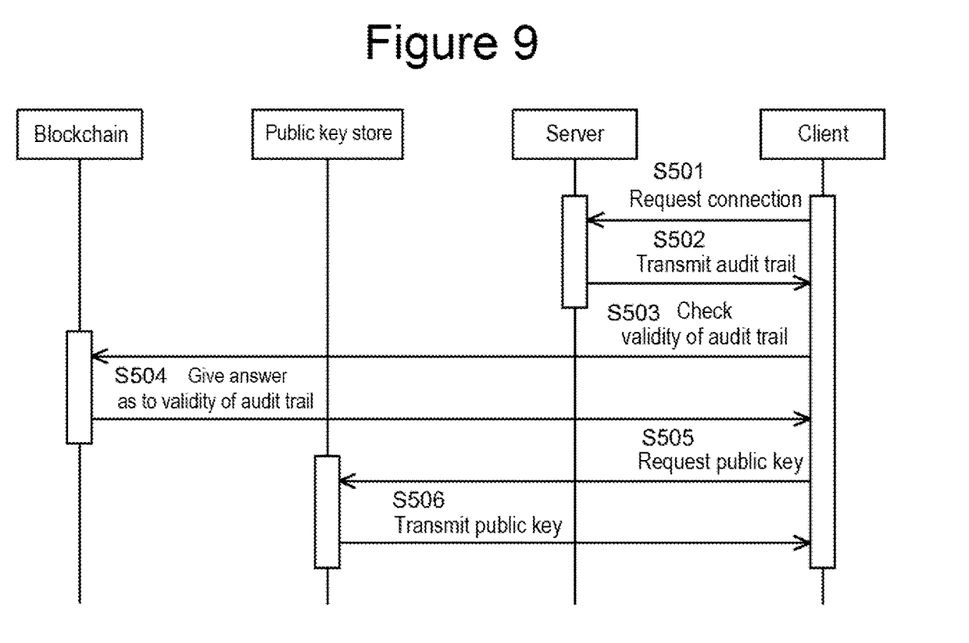
FIG. 9 is a sequence diagram showing a process performed between a server and client at the start of communications according to Embodiment 2 of the present invention.

FIG. 9 is a sequence diagram showing a flow of a process performed between the server 1 and client 3 at the start of communications using the Public Key Infrastructure. Processes of steps S501 to S504 are the same as the processes according to Embodiment 1 described with reference to steps S201 to S204 of FIG. 4 except that the audit trail does not contain the public key itself.

In the present embodiment, if the validity of the audit trail provided by the server 1 in processes up to step S504 is confirmed, the client 3 requests the public key of the server 1 from the public key store 4 in step S505. Since the public key of the server 1 and audit trail are stored in the public key store 4 by being linked together, in step S505, the client 3 transmits the audit trail provided by the server 1 to the blockchain 2 and requests the public key corresponding to the audit trail.

Then, in step S506, in response to the request from the client 3, the public key store 4 transmits the public key of the server 1, thereby finishing the process of providing the public key to the client 3. In this way, even though the public key itself is not registered in the blockchain 2, the public key can be provided to the client 3 using the public key store 4.

Note that a public key invalidation process can also be implemented by registering a block that indicates invalidation of the audit trail in the blockchain 2 as described with reference to FIG. 5 in Embodiment 1.

Also, in the present embodiment, recording of the public key used by the server 1 in the public key store 4 is only exemplary, and can be used to guarantee reliability of various other types of data. In particular, when the reliability of relatively large-size data needs to be guaranteed, the configuration of the present embodiment in which data is saved in a data store such as the public key store 4 can be used suitably.

Embodiment 3

Figure 10:
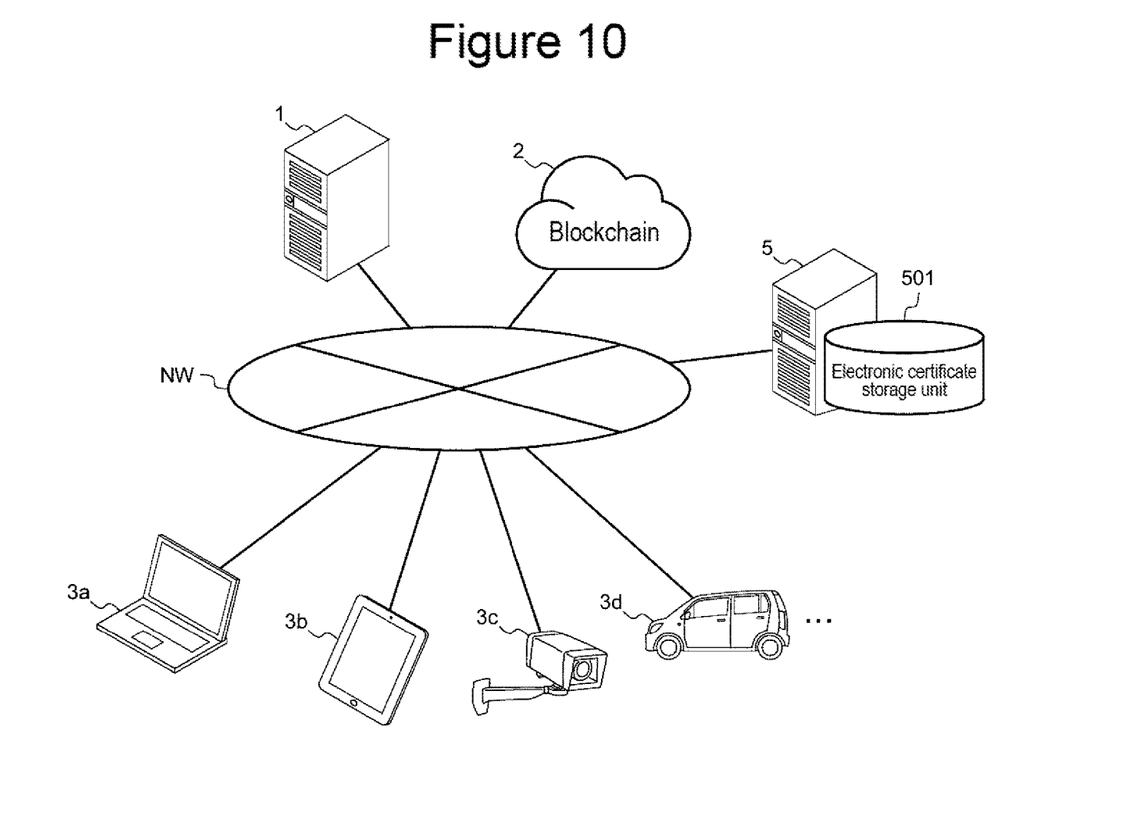
FIG. 10 is a configuration diagram of an electronic certification system according to Embodiment 3 of the present invention.

Embodiment 3 of the present invention will be described in detail below with reference to the drawings. Note that basically the same components as those in Embodiment 1 described above are denoted by the same reference numerals as the corresponding components in Embodiment 1, and description thereof will be omitted. FIG. 10 is a configuration diagram of an electronic certification system according to the present embodiment. As illustrated in FIG. 10, in addition to the server 1, blockchain 2, and clients 3, an electronic certificate store 5 equipped with an electronic certificate storage unit 501 is connected to the electronic certification system according to the present embodiment in such a way as to be able to communicate via the network NW.

Figure 11:
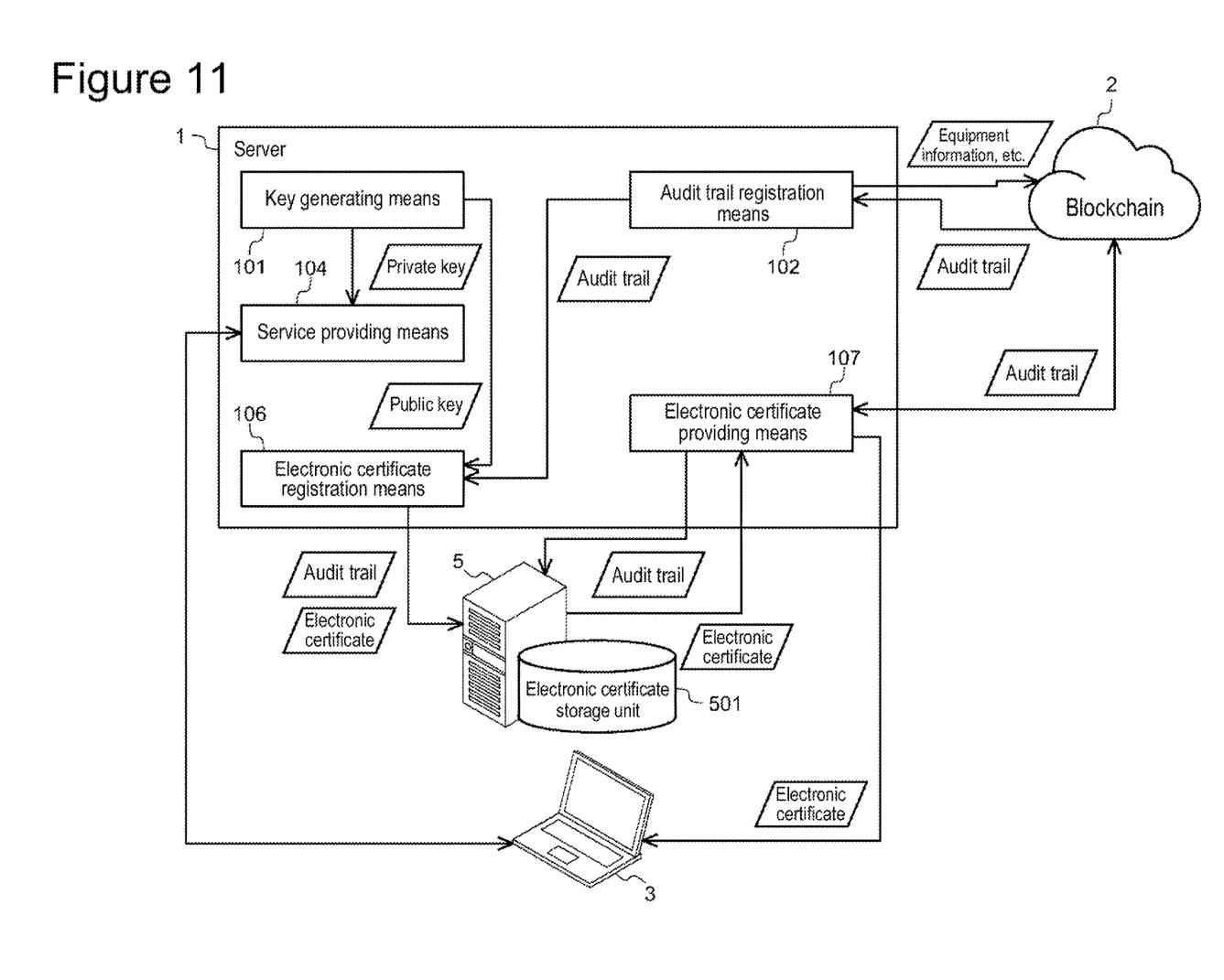
FIG. 11 is a functional block diagram of the electronic certification system according to Embodiment 3 of the present invention.

FIG. 11 is a functional block diagram of the electronic certification system according to the present embodiment. As illustrated in FIG. 11, in addition to the key generating means 101, audit trail registration means 102, audit trail providing means 103, and service providing means 104, the server 1 includes electronic certificate registration means 06 for requesting the electronic certificate store 5 to register an electronic certificate containing the public key of the server 1 and electronic certificate providing means 107 for providing the electronic certificate to the client 3.

<Audit Trail Registration Process>

Figure 12:
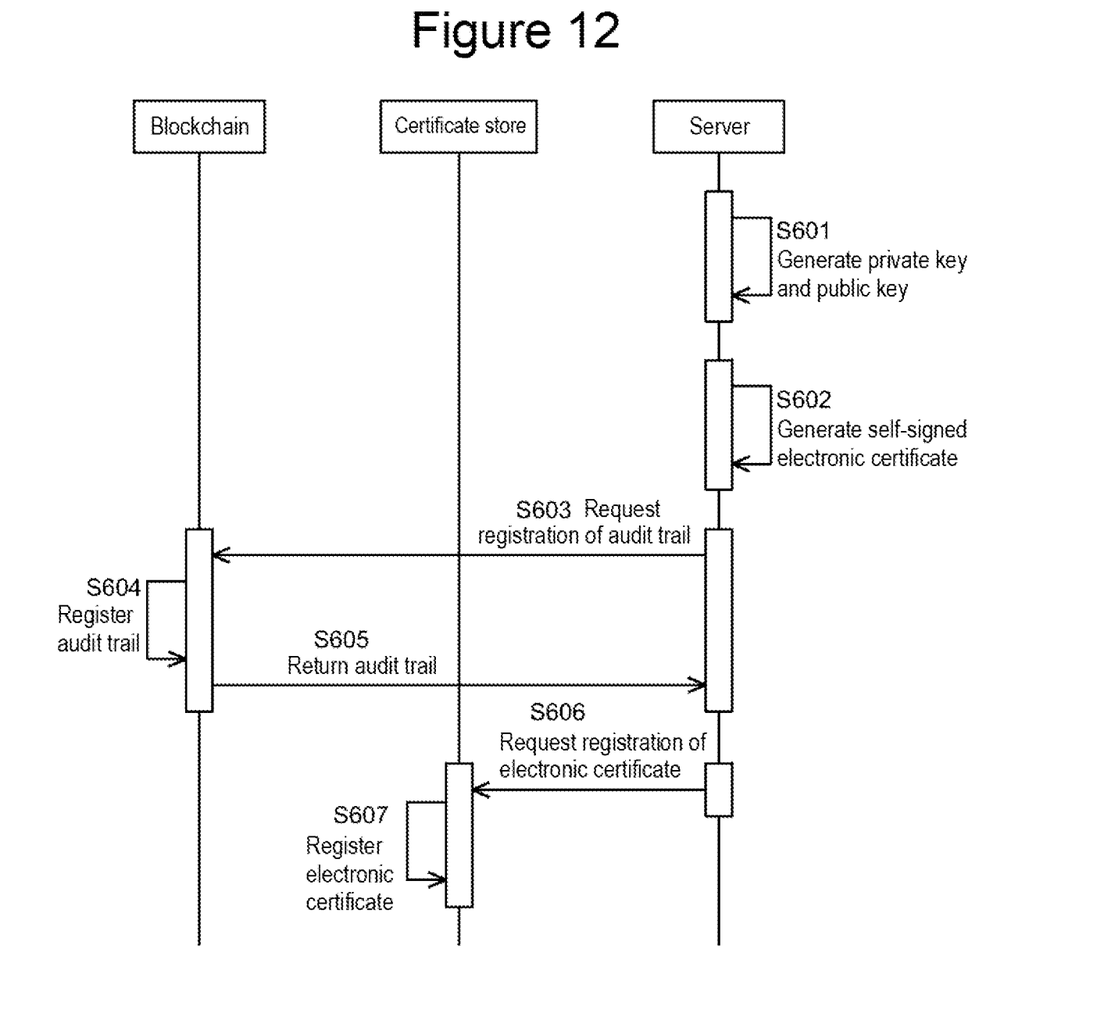
FIG. 12 is a sequence diagram showing a registration process of an audit trail and electronic certificate according to Embodiment 3 of the present invention.

FIG. 12 is a sequence diagram showing a flow of the process of registering an audit trail in the blockchain 2 and the process of registering an electronic certificate in the electronic certificate store 5 in the electronic certification system according to the present embodiment. First, in step S601, the key generating means 101 performs the process of generating a private key and public key of the server 1.

In step S602, the public key of the server 1 generated in step S601 and information about the server 1 are electronically signed, thereby generating an electronic certificate. Regarding the electronic signature given here, a private key for electronic signatures (hereinafter referred to as a signing private key) and a public key for verification of the electronic signatures (hereinafter referred to as a verifying public key) are prepared separately from the public key and private key generated in advance by the server 1 or generated in the generating process of the key generating means 101 in step S601, and an electronic signature generated by the signing private key is put on the electronic certificate containing the public key of the server 1 generated in step S601. That is, the electronic certificate generated here is a self-issued certificate self-signed by the server 1. Alternatively, without preparing the signing private key and verifying public key additionally, a self-signed certificate may be generated by electronically signing the public key generated in step S601 using the private key similarly generated in step S601.

In step S603, the audit trail registration means 102 performs the process of registering an audit trail in the blockchain 2. In the present embodiment, this is the process of requesting generation of a block via registration of information in the blockchain 2-the information including information about the server 1, information about the administrator of the server 1, and information about the service providing means 104 supposed to conduct communications later based on the Public Key Infrastructure using the public key of the server 1-and the electronic certificate itself is not registered in the blockchain 2.

After the audit trail is registered in the blockchain 2 in the above process, in step S606, the server 1 requests the electronic certificate store 5 to register the electronic certificate. In this request, the audit trail returned in step S605 and the electronic certificate generated in step S602 are requested to be recorded in the electronic certificate storage unit 501 of the electronic certificate store 5 by being linked together. In response to the request, the electronic certificate store 5 records the audit trail and electronic certificate in the electronic certificate storage unit 501 in step S607.

As a result of the above process, the information about the server 1 and the like are stored as an audit trail in the blockchain 2 and the electronic certificate of the server 1 is stored in the electronic certificate store 5 by being linked to the audit trail.

<Public Key Providing Process>

Figure 13:
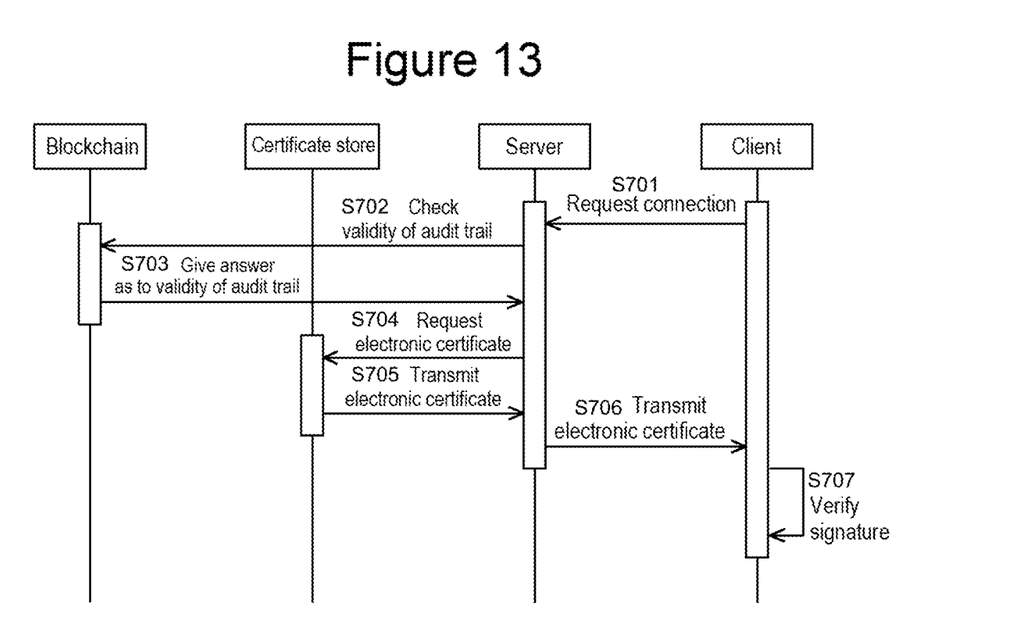
FIG. 13 is a sequence diagram showing a process performed between a server and client at the start of communications according to Embodiment 3 of the present invention.

FIG. 13 is a sequence diagram showing a flow of a process performed between the server 1 and client 3 at the start of communications using the Public Key Infrastructure. First, in step S701, a connection request is transmitted from the client 3 to the server Upon receiving the connection request, the server 1 checks in step S702 whether an own audit trail of the server 1 exists in a valid state in the blockchain 2.

If an answer is provided in step S703, stating that the audit trail of the server 1 is valid, the server 1 goes to step S704 and requests an electronic certificate linked to the audit trail. In step S705, the electronic certificate is transmitted to the server 1. Then, in step S706, the electronic certificate is transmitted from the server 1 to the client 3, and in step S707, a verification process for the electronic certificate is carried out.

In the verification process of step S707, if the electronic certificate has been signed with the signing private key, i.e., if the electronic certificate is a self-issued certificate, verification is done using the verifying public key provided by the server 1, and if the electronic certificate is a self-signed certificate signed with the private key of the server 1, the private key being paired with the public key contained in the electronic certificate, verification is done using the public key contained in the electronic certificate.

Note that since the electronic certificate provided by the server 1 here is a self-issued electronic certificate or self-signed electronic certificate, it is necessary that the server 1 has been registered with the client 3 in advance as being reliable.

The electronic certificate containing the public key of the server 1 is provided to the client 3 through the above procedures. Note that an electronic certificate validation process can also be implemented by registering a block that indicates invalidation of an audit trail in the blockchain 2 as described with reference to FIG. 5 in Embodiment 1.

Also, in the present embodiment, recording of the electronic certificate containing the public key used by the server 1 in the electronic certificate store 5 is only exemplary, and can be used to guarantee reliability of various other types of data. That is, a document such as an electric mail illustrated earlier by example can be provided to the client 3 by registering an electronic certificate containing the hash value of the document in the electronic certificate store 5.

The electronic certification system according to the present embodiment eliminates the need for processes including a process in which the client 3 receives an audit trail from the server 1 and a process in which the client 3 checks validity of the audit trail with the blockchain 2 and it is sufficient for the client 3 to be able to verify a self-issued certificate and a self-signed certificate as with a system using the conventional electronic certificate, and thus the electronic certification system according to the present invention can be implemented using a wider range of clients 3.

REFERENCE SIGNS LIST

1 Server
101 Key generating means
102 Audit trail registration means
103 Audit trail providing means
104 Service providing means
105 Public key registration means
106 Electronic certificate registration means
107 Electronic certificate providing means
2 Blockchain
3 Client 4 Public key store
401 Public key storage unit
5 Electronic certificate store
501 Electronic certificate storage unit
NW Network

The invention claimed is:

1. An electronic certification system that guarantees reliability of a public key of a first terminal using an audit trail registered in a blockchain, the electronic certification system comprising:

the first terminal, a second terminal and the blockchain are in electronic communication with one another via a network;

the first terminal includes a processor and a memory;

the memory of the first terminal stores a private key corresponding to the public key; the processor of the first terminal is configured to cause the first terminal to:

register information and the public key in the blockchain, the information relating to at least one of the first terminal, an administrator of the first terminal, and a program configured to run on the first terminal and exchange data with the second terminal, acquire the audit trail from the blockchain, wherein the audit trail is generated as a result of registering the information and the public key and contains the public key; and transmit the audit trail acquired from the blockchain to the second terminal;

the second terminal includes a processor that is configured to cause the second terminal to query the blockchain for the validity of the audit trail acquired from the first terminal and to receive a response to the query regarding validity of the audit trail; and when the second terminal determines that the response affirms the validity of the audit trail:

the processor of the second terminal causes the second terminal to determine that the public key is reliable;

the processor of the first terminal causes the first terminal to encrypt data using the private key to generate encrypted data and to send the encrypted data to the second terminal; and the processor of the second terminal causes the second terminal to decrypt the encrypted data using the public key contained in the audit trail.

2. The electronic certification system according to claim 1, wherein the processor of the first terminal is configured to cause the first terminal to request the blockchain to revoke a previously registered audit trail in order to register data in the blockchain indicating that the previously registered audit trail is invalid, and the data indicating the invalidity of the previously registered audit trail is registered in the blockchain after the previously registered audit trail is recorded in the blockchain.

3. An electronic certification method executed by, a first terminal having a processor and a memory, a second terminal in electronic communication with the first terminal and having a processor, and a blockchain that is in electronic communication with the first terminal and the second terminal, the electronic certification method comprises:

storing in the memory of the first terminal a private key corresponding to a public key associated with the blockchain;

registering in the blockchain, by the first terminal, information and the public key, the information relating to at least one of the first terminal, an administrator of the first terminal, and a program configured to run on the first terminal and exchange data with the second terminal;

electronically transmitting an audit trail, that is generated by the blockchain as a result of registering the information, from the blockchain to the first terminal, the audit trail contains the public key;

electronically transmitting the audit trail from the first terminal to the second terminal;

electronically transmitting an audit trail validity query from the second terminal to the blockchain;

electronically transmitting a response to the audit trail validity query from the blockchain to the second terminal, the response indicating validity of the audit trail; and when the response affirms the validity, the processor of the second terminal causing the second terminal to determine that the public key is reliable;

the processor of the first terminal causing the first terminal to encrypt data using the private key to generate encrypted data and to send the encrypted data to the second terminal; and the processor of the second terminal causing the second terminal to decrypt the encrypted data using the public key contained in the audit trail received from the first terminal.

* * * * *